US012792020B1

(12) United States Patent
Jee et al.

(10) Patent No.: US 12,792,020 B1
(45) Date of Patent: Nov. 10, 2026

(54) METHOD FOR PERFORMING ROOT CAUSE ANALYSIS IN MANUFACTURING PROCESS BY USING AGENT-BASED MULTIMODAL REASONING MODEL AND ROOT CAUSE ANALYZING DEVICE USING THE SAME

(71) Applicant: SemiAI Co., Ltd., Seoul (KR)

(72) Inventors: Tae Kwon Jee, Seoul (KR); Ji Hoon Jung, Seoul (KR); Jeng Hun Suh, Seoul (KR)

(73) Assignee: SEMIAI CO., LTD., Seoul (KR)

( * ) Notice: Subject to any disclaimer, the term of this patent is extended or adjusted under 35 U.S.C. 154(b) by 0 days.

(21) Appl. No.: 19/466,208

(22) Filed: Jan. 30, 2026

(30) Foreign Application Priority Data

Dec. 31, 2025 (KR) ........................ 10-2025-0216860

(51) Int. Cl.
*G05B 19/418* (2006.01)
*G05B 23/02* (2006.01)

(52) U.S. Cl.
CPC ... *G05B 19/4184* (2013.01); *G05B 19/41875* (2013.01); *G05B 23/0275* (2013.01)

(58) Field of Classification Search
None
See application file for complete search history.

(56) References Cited

U.S. PATENT DOCUMENTS

2023/0376012 A1* 11/2023 You .................... G05B 19/4184

FOREIGN PATENT DOCUMENTS

CN 120508966 A 8/2025

OTHER PUBLICATIONS

Miao, et al.—AgentIAD: Tool-Augmented Single-Agent for Industrial Anomaly Detection—Dec. 15, 2025—ArXiv—Available from Internet <URL:http://arxiv.org/abs/2512.13671v1).

* cited by examiner

*Primary Examiner* — Sean Shechtman
(74) *Attorney, Agent, or Firm* — Gallium Law; Jacob Panangat; Nam Nguyen

(57) ABSTRACT

There is provided a method for performing a root cause analysis in a manufacturing process by using an agent-based multimodal reasoning model. The method includes steps of: (a) generating, by a root cause analyzing device, through the multimodal reasoning model, first anomaly cause text information explaining a cause of occurrence of a first anomaly pattern by referring to at least one first analysis result; (b) repeating, by the root cause analyzing device, a root cause analysis iteration to (i) generate a k-th anomaly analysis task, (ii) generate (k+1)-th chart information, and (iii) generate (k+1)-th anomaly cause text information, and (c) when the root cause analysis iteration satisfies a preset termination condition, providing, by the root cause analyzing device, through the multimodal reasoning model, root cause information.

19 Claims, 11 Drawing Sheets

1300

2200

METHOD FOR PERFORMING ROOT CAUSE ANALYSIS IN MANUFACTURING PROCESS BY USING AGENT-BASED MULTIMODAL REASONING MODEL AND ROOT CAUSE ANALYZING DEVICE USING THE SAME

CROSS REFERENCE TO RELATED APPLICATION

This application claims the benefit of priority to Korean Patent Application No. 10-2025-0216860, filed on Dec. 31, 2025, the entire contents of which being incorporated herein by reference.

FIELD OF THE DISCLOSURE

The present disclosure relates to a method for performing a root cause analysis in a manufacturing process, and more specifically, a method for performing the root cause analysis in the manufacturing process by using an agent-based multimodal reasoning model capable of providing user-understandable root cause analysis information, and a root cause analyzing device using the same.

BACKGROUND OF THE DISCLOSURE

A manufacturing process in modern industries includes complex interactions among equipment, materials, process variables, and environmental conditions. Consequently, a system for recognizing an abnormal operation or an operation deviating from a specification in the manufacturing process increasingly utilizes sensors, inline measuring equipment, inspection systems and equipment logging devices in order to perform a root cause analysis.

The system generates massive amounts of heterogeneous data, including time-series traces, distribution summaries, spatial maps, image-based inspection results, and tool or station event logs, from various areas. To detect an anomaly from the manufacturing process, it is necessary to analyze these massive amounts of heterogeneous data, i.e., multimodal data, which not only requires a significant amount of time but also involves difficulties in integrating and analyzing the multimodal data.

In particular, since various interaction factors may cause similar symptoms, there are difficulties in performing the accurate root cause analysis (RCA) for the abnormal operation or the operation deviating from the specification.

For example, potential factors that can cause the abnormal operation or the operation deviating from the specification may include tool or station drifts, wear, contamination, or clogging of consumables, recipe or parameter changes, material lot variations, fixture misalignments, and sensor or measurement bias, and the similar symptoms may be occurred by these potential factors. Accordingly, it is difficult to accurately identify a potential cause, i.e., a root cause, that triggered the similar symptoms.

The root cause analysis in the manufacturing process may be achieved through a data-based method and a machine-learning-based method.

The data-based root cause analysis (i) secures structured and unstructured data related to a problem, such as log files and sensor data, through a data collecting process, (ii) improves an analysis accuracy by performing duplicate data removal, missing-value handling, and outlier identification through a data cleansing process, (iii) identifies relationships among variables through a correlation analysis and a causal analysis, (iv) visually provides hidden patterns through a visualization process by using scatter plots, heatmaps, pareto charts, and (v) determines a true root cause of the problem based on a statistical significance through a root cause identification process.

Also, the machine-learning-based method detects anomalies in the collected data by using a machine learning model trained with normal operating patterns, and analyzes the root cause by modeling relationships between causes and effects.

However, while such conventional data-based method and machine-learning-based method may be helpful in detecting the anomalous signs or predicting impacts on yield, there are limitations in interpretability, and they do not support an iterative and a traceable hypothesis-verification workflow that integrates multimodal data.

Accordingly, the applicant proposes a method for performing the root cause analysis that supports the iterative, the traceable, and an interpretable hypothesis-verification workflow that integrates the multimodal data.

SUMMARY OF THE DISCLOSURE

It is an object of the present disclosure to solve all the aforementioned problems.

It is another object of the present disclosure to easily interpret, by a user, a root cause of an anomaly in a manufacturing process.

It is still another object of the present disclosure to perform a root cause analysis in the manufacturing process by integrating multimodal data, which are acquired during the manufacturing process.

It is still yet another object of the present disclosure to accurately analyze the root cause of an actual symptom among potential factors causing similar symptoms in the manufacturing process.

It is still yet another object of the present disclosure to support an iterative, a traceable, and an interpretable hypothesis-verification workflow that integrates the multimodal data.

In accordance with one aspect of the present disclosure, there is provided a method for performing a root cause analysis in a manufacturing process by using an agent-based multimodal reasoning model, comprising steps of: (a) in response to acquiring at least one piece of first chart information generated by referring to first data, which is at least some data among process data and measurement data, wherein the process data has been acquired from at least one piece of process equipment capable of performing at least one manufacturing process for manufacturing a good, wherein the measurement data has been acquired by measuring a resultant product of the good generated by the process equipment, and wherein the resultant product is a finished product of the good or an intermediate product of the good, generating, by a root cause analyzing device, through the multimodal reasoning model, first anomaly cause text information explaining a cause of occurrence of a first anomaly pattern by referring to at least one first analysis result, which has been acquired by analyzing the first chart information; (b) repeating, by the root cause analyzing device, a root cause analysis iteration to (i) generate, through the multimodal reasoning model, a k-th anomaly analysis task for analyzing a k-th anomaly cause by referring to k-th anomaly cause text information and preset analysis policy information, wherein k is an integer increasing from 1, (ii) generate, through the multimodal reasoning model, (k+1)-th chart information by referring to (k+1)-th data according to the k-th anomaly analysis task, wherein the (k+1)-th data is at least some data, among the process data and the measurement data, corresponding to a k-th anomaly pattern, and (iii) generate, through the multimodal reasoning model, (k+1)-th anomaly cause text information explaining a cause of occurrence of a (k+1)-th anomaly pattern by referring to at least one (k+1)-th analysis result, which has been acquired by analyzing the (k+1)-th chart information, and (c) when the root cause analysis iteration satisfies a preset termination condition, providing, by the root cause analyzing device, through the multimodal reasoning model, root cause information for the manufacturing process by referring to final anomaly cause text information, which has been generated at a time of satisfying the preset termination condition.

As one example, at the step of (a), the first chart information includes any one of (i) (1_1_1)-st trend information to (1_1_m)-th trend information representing each of trends of each of (1_1)-st measurement values to (1_m)-th measurement values, wherein the (1_1)-st measurement values to the (1_m)-th measurement values are acquired respectively by measuring first resultant products to m-th resultant products generated respectively from first process equipment to m-th process equipment capable of performing a specific manufacturing process, and wherein m is an integer greater than or equal to 2, and (ii) (1_2_1)-st trend information to (1_2_n)-th trend information representing each of trends of each of (2_1)-st measurement values to (2_n)-th measurement values, wherein the (2_1)-st measurement values to the (2_n)-th measurement values are acquired respectively by measuring first set resultant products to n-th set resultant products generated respectively from specific process equipment capable of performing the specific manufacturing process, and wherein n is an integer greater than or equal to 2, and wherein the root cause analyzing device detects, through the multimodal reasoning model, the first anomaly pattern from any one of (i) the (1_1_1)-st trend information to the (1_1_m)-th trend information and (ii) the (1_2_1)-st trend information to the (1_2_n)-th trend information, and generates, through the multimodal reasoning model, the first anomaly cause text information representing that an anomaly exists in any one of (i) one or more first specific measurement values corresponding to at least one piece of (1_1)-st specific trend information, in which the first anomaly pattern has been detected, among the (1_1_1)-st trend information to the (1_1_m)-th trend information, and (ii) one or more second specific measurement values corresponding to at least one piece of (1_2)-nd specific trend information, in which the first anomaly pattern has been detected, among the (1_2_1)-st trend information to the (1_2_n)-th trend information.

As one example, at the step of (b), the root cause analyzing device instructs the multimodal reasoning model to (i) generate, as the (k+1)-th chart information, any one of (i-1) ((k+1)_1_1)-st distribution information to ((k+1)_1_m)-th distribution information, which are distributions for each of (1_1)-st partial measurement values to (1_m)-th partial measurement values that are part of the (1_1)-st measurement values to the (1_m)-th measurement values, corresponding to a period in which the k-th anomaly pattern is detected, and (i-2) ((k+1)_2_1)-st distribution information to ((k+1) 2_n)-th distribution information, which are distributions for each of (2_1)-st partial measurement values to (2_n)-th partial measurement values that are part of the (2_1)-st measurement values to the (2_n)-th measurement values, corresponding to a period in which the k-th anomaly pattern is detected, by using a k-th chart generating tool according to the k-th anomaly analysis task, (ii) generate, as the (k+1)-th anomaly cause text information, any one of (ii-1) ((k+1)_1)-st anomaly cause text information describing a cause of occurrence of the (k+1)-th anomaly pattern in at least one (1_1)-st specific resultant product manufactured by at least one piece of specific process equipment, wherein ((k+1)_1)-st anomaly cause text information corresponds to at least one piece of ((k+1)_1)-st specific distribution information, in which the (k+1)-th anomaly pattern has been detected, among the ((k+1)_1_1)-st distribution information to the ((k+1)_1_m)-th distribution information, and (ii-2) ((k+1)_2)-nd anomaly cause text information describing a cause of occurrence of the (k+1)-th anomaly pattern in at least one (1_2)-nd specific resultant product included in at least one specific set resultant product, wherein ((k+1)_2)-nd anomaly cause text information corresponds to at least one piece of ((k+1)_2)-nd specific distribution information, in which the (k+1)-th anomaly pattern has been detected, among the ((k+1)_2_1)-st distribution information to the ((k+1)_2_n)-th distribution information, with reference to the (k+1)-th analysis result, which has been acquired through analyzing the (k+1)-th chart information by using at least one k-th analysis tool.

As one example, at the step of (b), the root cause analyzing device instructs the multimodal reasoning model to generate, as the (k+1)-th chart information, any one of (i) (1_1)-st spatial chart information representing a matching between at least one first sub-measurement value and at least one first sub-resultant product, wherein the at least one first sub-measurement value has been acquired from first specific measurement values, among the (1_1)-st measurement values to the (1_m)-th measurement values, corresponding to the k-th anomaly pattern, wherein the first sub-resultant product is a product in which the first sub-measurement value is measured, and (ii) (1_2)-nd spatial chart information representing a matching between at least one second sub-measurement value and at least one second sub-resultant product, wherein the at least one second sub-measurement value has been acquired from second specific measurement values, among the (2_1)-st measurement values to the (2 n)-th measurement values, corresponding to the k-th anomaly pattern, wherein the second sub-resultant product is a product in which the second sub-measurement value is measured, according to the k-th anomaly analysis task.

As one example, at the step of (b), the root cause analyzing device instructs the multimodal reasoning model to generate a report including at least part of k-th analysis task information, the (k+1)-th chart information, the (k+1)-th analysis result and the (k+1)-th anomaly cause text information by using a report tool, and provide the report to a user through a user interface.

As one example, at the step of (c), the root cause analyzing device determines that the root cause analysis iteration satisfies the preset termination condition when a reliability value for the (k+1)-th anomaly cause text information exceeds a preset threshold value, a cardinal number of the root cause analysis iteration exceeds a preset threshold number, or an execution time of the root cause analysis iteration exceeds a preset threshold time.

As one example, at the step of (a), the root cause analyzing device generates, through a visualization module, the first chart information by referring to the first data, which has been acquired from a database storing the process data and the measurement data.

As one example, at the step of (b), the root cause analyzing device instructs the multimodal reasoning model to generate, through a visualization module, the (k+1)-th chart information by referring to the (k+1)-th data, which has been acquired from a database storing the process data and the measurement data.

As one example, at the step of (a), the root cause analyzing device instructs the multimodal reasoning model to detect the first anomaly pattern from a first image or a first video in which the first chart information is indicated, wherein, at the step of (b), the root cause analyzing device instructs the multimodal reasoning model to detect the (k+1)-th anomaly pattern from a (k+1)-th image or a (k+1)-th video in which the (k+1)-th chart information is indicated.

In accordance with another aspect of the present disclosure, there is provided a root cause analyzing device for performing a root cause analysis in a manufacturing process by using an agent-based multimodal reasoning model, comprising: at least one memory which saves instructions for performing the root cause analysis in the manufacturing process by using the agent-based multimodal reasoning model; and at least one processor configured to perform the root cause analysis in the manufacturing process by using the multimodal reasoning model according to the instructions saved in the memory to perform processes of: (I) in response to acquiring at least one piece of first chart information generated by referring to first data, which is at least some data among process data and measurement data, wherein the process data has been acquired from at least one piece of process equipment capable of performing at least one manufacturing process for manufacturing a good, wherein the measurement data has been acquired by measuring a resultant product of the good generated by the process equipment, and wherein the resultant product is a finished product of the good or an intermediate product of the good, generating, through the multimodal reasoning model, first anomaly cause text information explaining a cause of occurrence of a first anomaly pattern by referring to at least one first analysis result, which has been acquired by analyzing the first chart information; (II) repeating a root cause analysis iteration to (i) generate, through the multimodal reasoning model, a k-th anomaly analysis task for analyzing a k-th anomaly cause by referring to k-th anomaly cause text information and preset analysis policy information, wherein k is an integer increasing from 1, (ii) generate, through the multimodal reasoning model, (k+1)-th chart information by referring to (k+1)-th data according to the k-th anomaly analysis task, wherein the (k+1)-th data is at least some data, among the process data and the measurement data, corresponding to a k-th anomaly pattern, and (iii) generate, through the multimodal reasoning model, (k+1)-th anomaly cause text information explaining a cause of occurrence of a (k+1)-th anomaly pattern by referring to at least one (k+1)-th analysis result, which has been acquired by analyzing the (k+1)-th chart information, and (III) when the root cause analysis iteration satisfies a preset termination condition, providing, through the multimodal reasoning model, root cause information for the manufacturing process by referring to final anomaly cause text information, which has been generated at a time of satisfying the preset termination condition.

As one example, the first chart information includes any one of (i) (1_1_1)-st trend information to (1_1_m)-th trend information representing each of trends of each of (1_1)-st measurement values to (1_m)-th measurement values, wherein the (1_1)-st measurement values to the (1_m)-th measurement values are acquired respectively by measuring first resultant products to m-th resultant products generated respectively from first process equipment to m-th process equipment capable of performing a specific manufacturing process, and wherein m is an integer greater than or equal to 2, and (ii) (1_2_1)-st trend information to (1_2_n)-th trend information representing each of trends of each of (2_1)-st measurement values to (2_n)-th measurement values, wherein the (2_1)-st measurement values to the (2_n)-th measurement values are acquired respectively by measuring first set resultant products to n-th set resultant products generated respectively from specific process equipment capable of performing the specific manufacturing process, and wherein n is an integer greater than or equal to 2, and wherein, at the process of (I), the processor detects, through the multimodal reasoning model, the first anomaly pattern from any one of (i) the (1_1_1)-st trend information to the (1_1_m)-th trend information and (ii) the (1_2_1)-st trend information to the (1_2_n)-th trend information, and generates, through the multimodal reasoning model, the first anomaly cause text information representing that an anomaly exists in any one of (i) one or more first specific measurement values corresponding to at least one piece of (1_1)-st specific trend information, in which the first anomaly pattern has been detected, among the (1_1_1)-st trend information to the (1_1_m)-th trend information, and (ii) one or more second specific measurement values corresponding to at least one piece of (1_2)-nd specific trend information, in which the first anomaly pattern has been detected, among the (1_2_1)-st trend information to the (1_2_n)-th trend information.

As one example, at the process of (II), the processor instructs the multimodal reasoning model to (i) generate, as the (k+1)-th chart information, any one of (i-1) ((k+1)_1_1)-st distribution information to ((k+1)_1_m)-th distribution information, which are distributions for each of (1_1)-st partial measurement values to (1_m)-th partial measurement values that are part of the (1_1)-st measurement values to the (1_m)-th measurement values, corresponding to a period in which the k-th anomaly pattern is detected, and (i-2) ((k+1)_2_1)-st distribution information to ((k+1)_2_n)-th distribution information, which are distributions for each of (2_1)-st partial measurement values to (2_n)-th partial measurement values that are part of the (2_1)-st measurement values to the (2_n)-th measurement values, corresponding to a period in which the k-th anomaly pattern is detected, by using a k-th chart generating tool according to the k-th anomaly analysis task, (ii) generate, as the (k+1)-th anomaly cause text information, any one of (ii-1) ((k+1)_1)-st anomaly cause text information describing a cause of occurrence of the (k+1)-th anomaly pattern in at least one (1_1)-st specific resultant product manufactured by at least one piece of specific process equipment, wherein ((k+1)_1)-st anomaly cause text information corresponds to at least one piece of ((k+1)_1)-st specific distribution information, in which the (k+1)-th anomaly pattern has been detected, among the ((k+1)_1_1)-st distribution information to the ((k+1)_1_m)-th distribution information, and (ii-2) ((k+1)_2)-nd anomaly cause text information describing a cause of occurrence of the (k+1)-th anomaly pattern in at least one (1_2)-nd specific resultant product included in at least one specific set resultant product, wherein ((k+1)_2)-nd anomaly cause text information corresponds to at least one piece of ((k+1)_2)-nd specific distribution information, in which the (k+1)-th anomaly pattern has been detected, among the ((k+1)_2_1)-st distribution information to the ((k+1)_2_n)-th distribution information, with reference to the (k+1)-th analysis result, which has been acquired through analyzing the (k+1)-th chart information by using at least one k-th analysis tool.

As one example, at the process of (II), the processor instructs the multimodal reasoning model to generate, as the (k+1)-th chart information, any one of (i) (1_1)-st spatial chart information representing a matching between at least one first sub-measurement value and at least one first sub-resultant product, wherein the at least one first sub-measurement value has been acquired from first specific measurement values, among the (1_1)-st measurement values to the (1_m)-th measurement values, corresponding to the k-th anomaly pattern, wherein the first sub-resultant product is a product in which the first sub-measurement value is measured, and (ii) (1_2)-nd spatial chart information representing a matching between at least one second sub-measurement value and at least one second sub-resultant product, wherein the at least one second sub-measurement value has been acquired from second specific measurement values, among the (2_1)-st measurement values to the (2_n)-th measurement values, corresponding to the k-th anomaly pattern, wherein the second sub-resultant product is a product in which the second sub-measurement value is measured, according to the k-th anomaly analysis task.

As one example, at the process of (II), the processor instructs the multimodal reasoning model to generate a report including at least part of k-th analysis task information, the (k+1)-th chart information, the (k+1)-th analysis result and the (k+1)-th anomaly cause text information by using a report tool, and provide the report to a user through a user interface.

As one example, at the process of (III), the processor determines that the root cause analysis iteration satisfies the preset termination condition when a reliability value for the (k+1)-th anomaly cause text information exceeds a preset threshold value, a cardinal number of the root cause analysis iteration exceeds a preset threshold number, or an execution time of the root cause analysis iteration exceeds a preset threshold time.

As one example, at the process of (I), the processor generates, through a visualization module, the first chart information by referring to the first data, which has been acquired from a database storing the process data and the measurement data.

As one example, at the process of (II), the processor instructs the multimodal reasoning model to generate, through a visualization module, the (k+1)-th chart information by referring to the (k+1)-th data, which has been acquired from a database storing the process data and the measurement data.

As one example, at the process of (I), the processor instructs the multimodal reasoning model to detect the first anomaly pattern from a first image or a first video in which the first chart information is indicated, wherein, at the process of (II), the processor instructs the multimodal reasoning model to detect the (k+1)-th anomaly pattern from a (k+1)-th image or a (k+1)-th video in which the (k+1)-th chart information is indicated.

In accordance with another aspect of the present disclosure, there is provided a computer-readable recording medium for storing computer-executable instructions, wherein the computer-readable recording medium implements the method for performing the root cause analysis according to any one of Claims 1 to 9 when the computer-executable instructions are executed.

BRIEF DESCRIPTION OF THE DRAWINGS

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
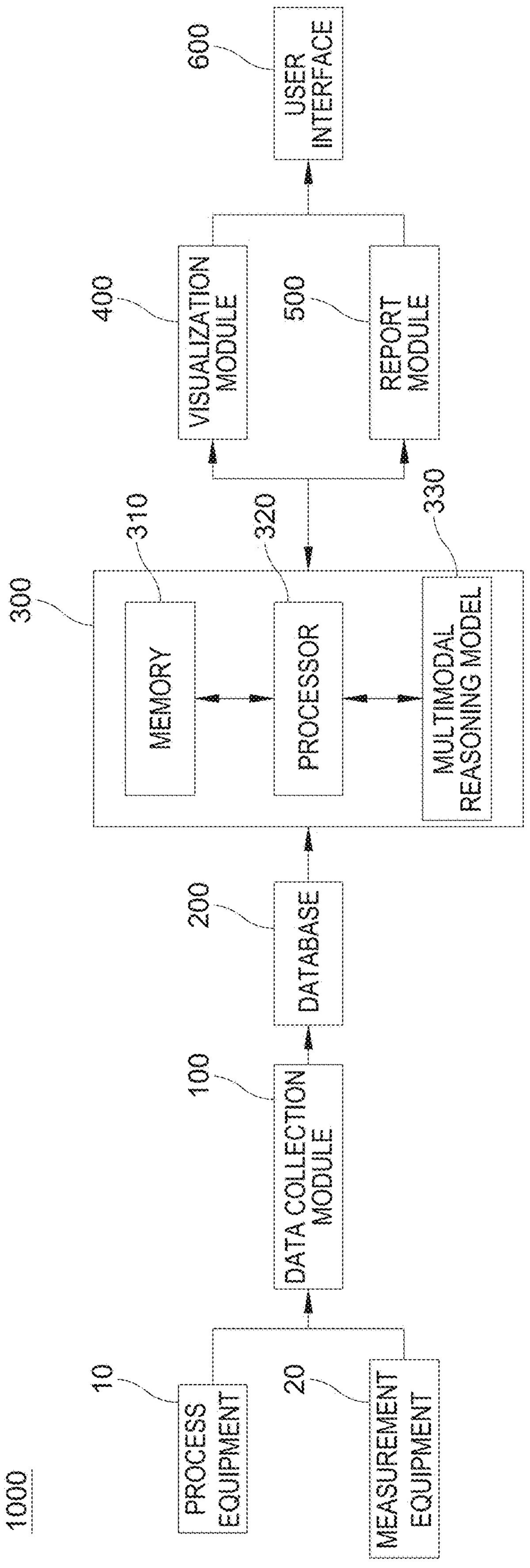
FIG. 1 is a drawing schematically illustrating a system for performing a root cause analysis in a manufacturing process by using an agent-based multimodal reasoning model in accordance with one example embodiment of the present disclosure.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to carry out the present invention easily, the example embodiments of the present invention by referring to attached diagrams will be explained in detail as shown below.

FIG. 1 is a drawing schematically illustrating a system for performing a root cause analysis in a manufacturing process by using an agent-based multimodal reasoning model in accordance with one example embodiment of the present disclosure. By referring to FIG. 1, the root cause analysis system 1000 may include a data collection module 100, a database 200, a root cause analyzing device 300, a visualization module 400, a report module 500 and a user interface 600.

First, the data collection module 100 may collect process data from at least one piece of process equipment 10 capable of performing at least one manufacturing process for manufacturing a good, and may acquire measurement data from at least one piece of measurement equipment 20 by measuring a resultant product of the good generated by the process equipment 10, wherein the resultant product is a finished product of the good or an intermediate product of the good. For reference, in FIG. 1, only one piece of process equipment 10 and one piece of measurement equipment 20 are illustrated, but the present disclosure is not limited thereto, and the process equipment 10 and the measurement equipment 20 may each be configured in multiple units.

Next, the database 200 may store the process data and the measurement data, which are acquired by the data collection module 100. That is, the database 200 may store the process data, which is acquired from at least one piece of process equipment 10 capable of performing at least one manufacturing process for manufacturing the good, and the measurement data, which is acquired by measuring the resultant product of the good generated by the process equipment 10.

Next, the root cause analyzing device 300 may include at least one memory 310 which saves instructions for performing the root cause analysis in the manufacturing process by using the agent-based multimodal reasoning model, and at least one processor 320 configured to perform the root cause analysis in the manufacturing process by using the multimodal reasoning model according to the instructions saved in the memory 310.

Specifically, the root cause analyzing device 300 may typically achieve a desired system performance by using combinations of at least one computing hardware and at least one computer software, wherein the computing hardware may be a computer processor, a memory, a storage, an input device, an output device, or any other conventional computing components, an electronic communication device such as a router or a switch, an electronic information storage system such as a network-attached storage (NAS) and a storage area network (SAN), and wherein the computer software may be any instructions that allow the computing device to function in a specific way, but the present disclosure is not limited thereto.

Also, the processor 320 of the root cause analyzing device 300 may include a hardware configuration of MPU (Micro Processing Unit) or CPU (Central Processing Unit), cache memory, data bus, etc. Additionally, any OS (operating system) and software configuration of applications that achieve specific purposes may further be included.

However, it does not exclude a case of the root cause analyzing device 300 including an integrated processor which is an integrated form of the medium, the processor, and the memory for performing the present disclosure.

Meanwhile, according to the instructions stored in the memory 310, the processor 320 of the root cause analyzing device 300 may perform a process of: in response to acquiring at least one piece of first chart information generated by referring to first data, which is at least some data among the process data and the measurement data, wherein the process data has been acquired from at least one piece of process equipment 10 capable of performing at least one manufacturing process for manufacturing the good, wherein the measurement data has been acquired by measuring the resultant product of the good generated by the process equipment, and wherein the resultant product is the finished product of the good or the intermediate product of the good, generating, through the multimodal reasoning model 330, first anomaly cause text information explaining a cause of occurrence of a first anomaly pattern by referring to at least one first analysis result, which has been acquired by analyzing the first chart information. In addition, according to the instructions stored in the memory 310, the processor 320 of the root cause analyzing device 300 may perform a process of: repeating a root cause analysis iteration to (i) generate, through the multimodal reasoning model 330, a k-th anomaly analysis task for analyzing a k-th anomaly cause by referring to k-th anomaly cause text information and preset analysis policy information, wherein k is an integer increasing from 1, (ii) generate, through the multimodal reasoning model 330, (k+1)-th chart information by referring to (k+1)-th data according to the k-th anomaly analysis task, wherein the (k+1)-th data is at least some data, among the process data and the measurement data, corresponding to a k-th anomaly pattern, and (iii) generate, through the multimodal reasoning model 330, (k+1)-th anomaly cause text information explaining a cause of occurrence of a (k+1)-th anomaly pattern by referring to at least one (k+1)-th analysis result, which has been acquired by analyzing the (k+1)-th chart information. Then, according to the instructions stored in the memory 310, the processor 320 of the root cause analyzing device 300 may perform a process of: when the root cause analysis iteration satisfies a preset termination condition, providing, through the multimodal reasoning model 330, root cause information for the manufacturing process by referring to final anomaly cause text information, which has been generated at a time of satisfying the preset termination condition. For reference, in FIG. 1, the multimodal reasoning model 330 is illustrated as being included in the root cause analyzing device 300, but the present disclosure is not limited thereto, and the multimodal reasoning model 330 may be installed in a computing device different from the root cause analyzing device 300 or may be installed in a cloud environment.

Next, the visualization module 400 may generate visualized chart information by referring to at least some data among the process data and the measurement data. Herein, the chart information may include various type of visualized charts for analyzing an anomaly in the manufacturing process, such as trend charts, statistical charts, and spatial charts.

Next, the report module 500 may generate a report including at least part of analysis task information for analyzing the anomaly in the manufacturing process, chart information, an analysis result acquired by analyzing the chart information, and anomaly cause text information generated by referring to the analysis result.

Next, the user interface 600 may display the chart information generated by the visualization module 400 or the report generated by the report module 500 so that the user may check it.

Figure 2:
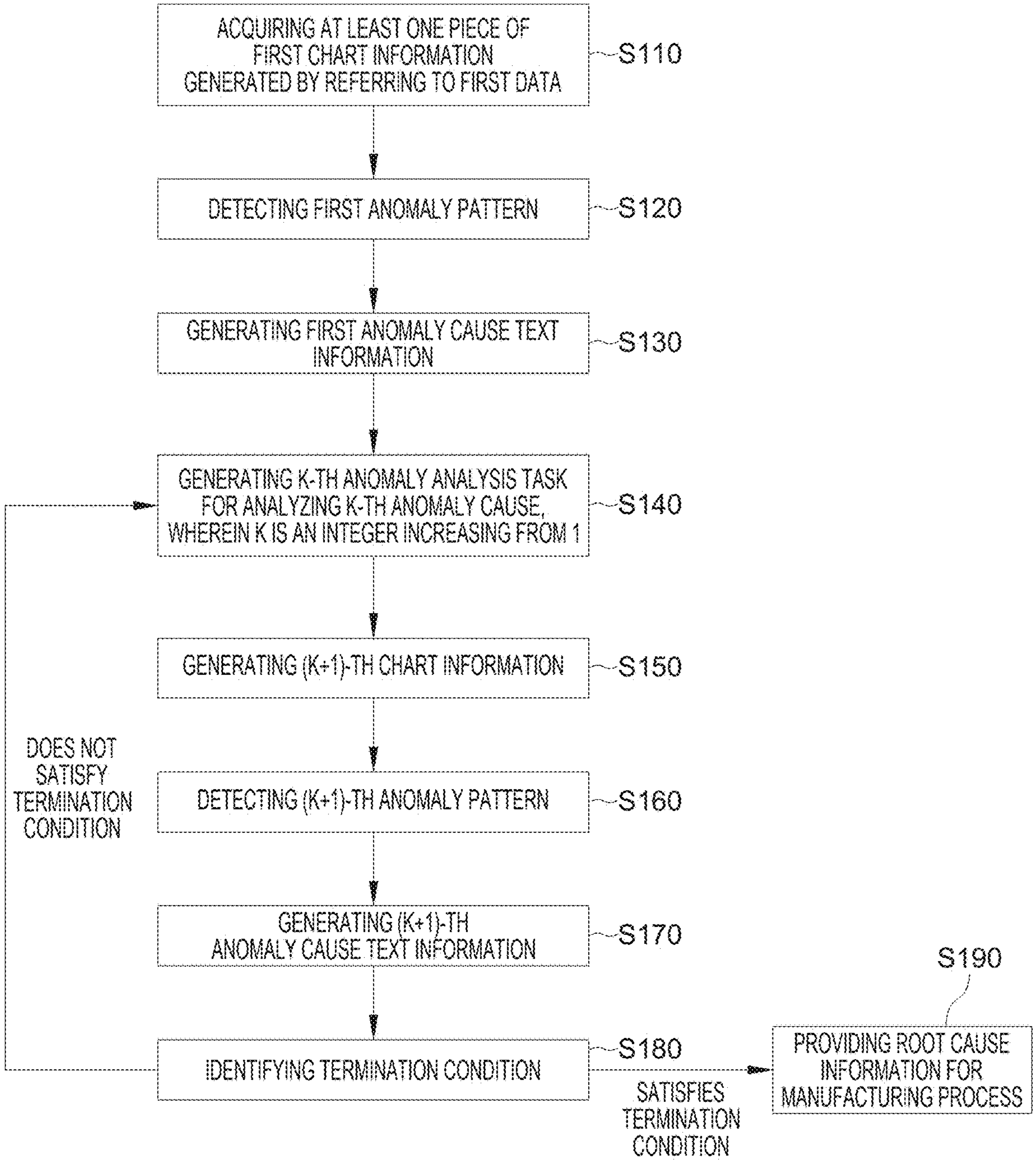
FIG. 2 is a drawing schematically illustrating a method for performing the root cause analysis in the manufacturing process by using the agent-based multimodal reasoning model in accordance with one example embodiment of the present disclosure.

By referring to the root cause analysis system 1000, the method for performing the root cause analysis in the manufacturing process by using the agent-based multimodal reasoning model will be described in more detail by referring to FIG. 1 and FIG. 2 as follows.

First, the root cause analyzing device 300 may acquire at least one piece of the first chart information generated by referring to the first data, which is at least some data among the process data and the measurement data at a step of S110. Herein, the process data has been acquired from the at least one piece of process equipment capable of performing the at least one manufacturing process for manufacturing the good. Further, the measurement data has been acquired by measuring the resultant product of the good generated by the process equipment. Also, the resultant product is the finished product of the good or the intermediate product of the good.

Herein, the root cause analyzing device 300 may generate, through the visualization module 400, the first chart information by referring to the first data, which is acquired from the database 200 storing the process data and the measurement data. However, the present disclosure is not limited thereto, and the root cause analyzing device 300 may generate, through the visualization module 400, the first chart information by directly acquiring the first data from the data collection module 100 that collects the process data and the measurement data from the process equipment 10 and the measurement equipment 20, respectively, without using the database 200.

In addition, the first chart information may be various types of visualized charts for analyzing the anomaly in the manufacturing process, and may include any one of the trend chart, the statistical chart, a box plot, a histogram, a distribution plot, and a spatial map, but the present disclosure is not limited thereto, and the first chart information may be any one of various types of charts that visualize statistical information of the data.

For example, the first chart information may be (1_1_1)-st trend information to (1_1_m)-th trend information representing each of trends of each of (1_1)-st measurement values to (1_m)-th measurement values. Herein, the (1_1)-st measurement values to the (1_m)-th measurement values are acquired respectively by measuring first resultant products to m-th resultant products generated respectively from first process equipment to m-th process equipment, which are multiple pieces of process equipment capable of performing a specific manufacturing process.

As another example, the first chart information may be (1_2_1)-st trend information to (1_2_n)-th trend information representing each of trends of each of (2_1)-st measurement values to (2_n)-th measurement values Herein, the (2_1)-st measurement values to the (2_n)-th measurement values are acquired respectively by measuring first set resultant products to n-th set resultant products, which are multiple sets of resultant products, generated respectively from specific process equipment, which is a single piece of process equipment, capable of performing the specific manufacturing process. Herein, the set resultant products may represent resultant products produced in preset manufacturing units on the specific process equipment.

For reference, in (a_b_*)-th trend information, "a" is to distinguish an iteration order for the root cause analysis in the manufacturing process, and "b" is to distinguish between cases using multiple pieces of process equipment and cases using a single piece of process equipment.

Next, the root cause analyzing device 300 may detect, through the multimodal reasoning model 330, the first anomaly pattern by analyzing the first chart information, which is generated by referring to the first data, at a step of S120.

That is, the root cause analyzing device 300 may input the first chart information, i.e. data points according to the first chart information or a representation acquired by encoding the first chart information, into the multimodal reasoning model 330, to thereby instruct the multimodal reasoning model 330 to detect the first anomaly pattern corresponding to an abnormal operation or an operation deviating from a specification in the first chart information. Alternatively, the root cause analyzing device 300 may input a first image or a first video in which the first chart information is indicated into the multimodal reasoning model 330, to thereby instruct the multimodal reasoning model 330 to detect the first anomaly pattern from the first image or the first video. In this process, the multimodal reasoning model performs semantic mapping by extracting visual features from the chart information such as trend slopes, outliers, and spatial clusters-and interpreting these features in the context of manufacturing domain knowledge to identify specific equipment anomalies (e.g., scanner chuck drifts).

For example, the root cause analyzing device 300 may detect, through the multimodal reasoning model 330, the first anomaly pattern (i) from the (1_1_1)-st trend information to the (1_1_m)-th trend information corresponding to the first resultant products to the m-th resultant products generated respectively from the first process equipment to the m-th process equipment, which are multiple pieces of process equipment, capable of performing the specific manufacturing process, or (ii) from the (1_2_1)-st trend information to the (1_2_n)-th trend information corresponding to the first set resultant products to the n-th set resultant products, which are multiple sets of resultant products, generated from the specific process equipment.

Next, the root cause analyzing device 300 may generate, through the multimodal reasoning model 330, the first anomaly cause text information explaining the cause of occurrence of the first anomaly pattern by referring to the at least one first analysis result, which has been acquired by analyzing the first chart information, at a step of S130.

That is, the root cause analyzing device 300 may instruct the multimodal reasoning model 330 to generate anomaly cause text information indicating that the first anomaly pattern was detected in the first chart information and that the abnormal operation or the operation deviating from the specification, such as a process deviation, occurred in the area where the first anomaly pattern was detected. Herein, the anomaly cause text information may include any one of (i) natural language text describing an anomaly cause, (ii) structured data expressing the anomaly cause in a predefined format, and (iii) vector embedding which is acquired by encoding a description of the anomaly cause. In addition, the root cause analyzing device 300 may generate the first anomaly cause text information by further including, when the first anomaly pattern is detected, a section of the first chart information in which the first anomaly pattern occurred and an inference result regarding a specific cause of the first anomaly pattern, rather than simply generating the first anomaly cause text information based solely on the result of detecting the first anomaly pattern.

For example, through the multimodal reasoning model 330, the root cause analyzing device 300 may (i) generate the first anomaly cause text information representing that the anomaly exists in one or more first specific measurement values corresponding to at least one piece of (1_1)-st specific trend information, in which the first anomaly pattern has been detected, among the (1_1_1)-st trend information to the (1_1_m)-th trend information, wherein the (1_1_1)-st trend information to the (1_1_m)-th trend information correspond to the first resultant products to the m-th resultant products generated from the first process equipment to the m-th process equipment, which are multiple pieces of process equipment capable of performing the specific manufacturing process or (ii) generate the first anomaly cause text information representing that the anomaly exists in one or more second specific measurement values corresponding to at least one piece of (1_2)-nd specific trend information, in which the first anomaly pattern has been detected, among the (1_2_1)-st trend information to the (1_2_n)-th trend information, wherein the (1_2_1)-st trend information to the (1_2_n)-th trend information correspond to the first set resultant products to the n-th set resultant products, which are multiple sets of the resultant products, generated from the specific process equipment.

Next, the root cause analyzing device 300 may generate, through the multimodal reasoning model 330, the k-th anomaly analysis task for analyzing the k-th anomaly cause by referring to k-th anomaly cause text information and preset analysis policy information at a step of S140. Herein, k is an integer increasing from 1.

That is, the root cause analyzing device 300 may input the k-th anomaly cause text information and at least one prompt and/or structured configuration data into the multimodal reasoning model 330, to thereby instruct the multimodal reasoning model 330 to generate the k-th anomaly analysis task for analyzing the k-th anomaly cause by referring to the k-th anomaly cause text information and the analysis policy. Herein, the at least one prompt and/or the structured configuration data correspond to the analysis policy for the corresponding manufacturing process. Further, the k-th anomaly analysis task may include a statistical analysis plan for data corresponding to the k-th anomaly cause, an additional chart creation plan, and an analysis tool usage plan, but the present disclosure is not limited thereto, and may include various plans for analyzing the k-th anomaly cause. In addition, the multimodal reasoning model 330 may determine an analysis method for statistically analyzing the k-th anomaly cause by referring to the k-th anomaly cause text information and the analysis policy, select an analysis tool for performing the determined analysis method, generate code for executing the same, determine a chart type for visualizing an analysis result, which is acquired by the analysis tool, and generate code for executing a chart tool capable of generating the corresponding chart type.

Next, the root cause analyzing device 300 may generate, through the multimodal reasoning model 330, the (k+1)-th chart information by referring to the (k+1)-th data according to the k-th anomaly analysis task at a step of S150. Herein, the (k+1)-th data is at least some data, among the process data and the measurement data, corresponding to the k-th anomaly pattern.

That is, the root cause analyzing device 300 may instruct the multimodal reasoning model 330 to generate, through the visualization module 400, the (k+1)-th chart information by referring to the (k+1)-th data, which is acquired from the database 200 storing the process data and the measurement data. Herein, the multimodal reasoning model 330 may execute code for operating the visualization module 400, to thereby instruct the visualization module 400 to acquire the (k+1)-th data from the database 200, and generate the (k+1)-th chart information by using the acquired (k+1)-th data. In addition, the (k+1)-th chart information may be various types of visualized charts for analyzing the anomaly in the manufacturing process, and may include any one of the trend chart, the statistical chart, the box plot, the histogram, the distribution plot, and the spatial map, but the present disclosure is not limited thereto, and the (k+1)-th chart information may be any one of various types of charts that visualize statistical information for analyzing (k+1)-th data. Also, the (k+1)-th chart information and the first chart information may be of the same type of chart, but may also be of different types of charts, and even if they are of the same type of chart, the data constituting the charts may be different.

For example, the root cause analyzing device 300 may instruct the multimodal reasoning model 330 to generate, as the (k+1)-th chart information, ((k+1)_1_1)-st distribution information to ((k+1)_1_m)-th distribution information, which are distributions for each of (1_1)-st partial measurement values to (1_m)-th partial measurement values that are part of the (1_1)-st measurement values to the (1_m)-th measurement values, corresponding to a period in which the k-th anomaly pattern was detected, by using a k-th chart generating tool according to the k-th anomaly analysis task. Herein, the (1_1)-st measurement values to the (1_m)-th measurement values are acquired respectively by measuring the first resultant products to the m-th resultant products generated respectively from the first process equipment to the m-th process equipment, which are multiple pieces of process equipment capable of performing the specific manufacturing process.

As another example, the root cause analyzing device 300 may instruct the multimodal reasoning model 330 to generate, as the (k+1)-th chart information, ((k+1)_2_1)-st distribution information to ((k+1)_2_n)-th distribution information, which are distributions for each of (2_1)-st partial measurement values to (2_n)-th partial measurement values that are part of the (2_1)-st measurement values to the (2_n)-th measurement values, corresponding to a period in which the k-th anomaly pattern was detected, by using the k-th chart generating tool according to the k-th anomaly analysis task. Herein, the (2_1)-st measurement values to the (2_n)-th measurement values are acquired respectively by measuring the first set resultant products to the n-th set resultant products, which are multiple sets of the resultant products, generated respectively from the specific process equipment, which is a single piece of process equipment, capable of performing the specific manufacturing process.

For reference, in (a_b_*)-th distribution information, "a" is to distinguish an iteration order for the root cause analysis in the manufacturing process, and "b" is to distinguish between cases using the multiple pieces of process equipment and cases using a single piece of process equipment.

Also, the root cause analyzing device 300 may (i) instruct the multimodal reasoning model 330 to generate, as the (k+1)-th chart information, (1_1)-st spatial chart information representing a matching between at least one first sub-measurement value and at least one first sub-resultant product, wherein the at least one first sub-measurement value has been acquired from first specific measurement values, among the (1_1)-st measurement values to the (1_m)-th measurement values, corresponding to the k-th anomaly pattern, wherein the first sub-resultant product is a product in which the first sub-measurement value is measured, according to the k-th anomaly analysis task or (ii) instruct the multimodal reasoning model 330 to generate, as the (k+1)-th chart information, (1_2)-nd spatial chart information representing a matching between at least one second sub-measurement value and at least one second sub-resultant product, wherein the at least one second sub-measurement value has been acquired from second specific measurement values, among the (2_1)-st measurement values to the (2_n)-th measurement values, corresponding to the k-th anomaly pattern, wherein the second sub-resultant product is a product in which the second sub-measurement value is measured, according to the k-th anomaly analysis task. Herein, the specific measurement values may refer to measurement values included in one measurement value group in which an anomaly pattern is detected among multiple measurement value groups, i.e., the (1_1)-st measurement values to the (1_m)-th measurement values or the (2_1)-st measurement values to the (2_n)-th measurement values, and the sub-measurement value may refer to measurement values in a section (for example, a time section and/or a spatial section) in which the anomaly pattern is detected among the specific measurement values.

Next, the root cause analyzing device 300 may detect, through the multimodal reasoning model 330, the (k+1)-th anomaly pattern by referring to the (k+1)-th analysis result, which has been acquired through analyzing the (k+1)-th chart information, at a step of S160. Herein, the root cause analyzing device 300 may instruct the multimodal reasoning model 330 to detect the (k+1)-th anomaly pattern from a (k+1)-th image or a (k+1)-th video in which the (k+1)-th chart information is indicated. In addition, the (k+1)-th anomaly pattern may be acquired by detecting by referring to a result of analyzing an overall distribution and an outlier of the data in the (k+1)-th chart information.

Next, the root cause analyzing device 300 may generate, through the multimodal reasoning model 330, the (k+1)-th anomaly cause text information describing a cause of occurrence of the (k+1)-th anomaly pattern by referring to the (k+1)-th analysis result at a step of S170. Herein, the multimodal reasoning model 330 may generate the (k+1)-th anomaly cause text information by including not only the cause of occurrence of the (k+1)-th anomaly pattern but also a specific explanation of a type of occurrence of the (k+1)-th anomaly pattern and a result of inferring the meaning of the (k+1)-th anomaly pattern by analyzing the (k+1)-th anomaly pattern.

For example, the root cause analyzing device 300 may instruct the multimodal reasoning model 330 to generate, as the (k+1)-th anomaly cause text information, ((k+1)_1)-st anomaly cause text information describing a cause of occurrence of the (k+1)-th anomaly pattern in at least one (1_1)-st specific resultant product manufactured by at least one piece of specific process equipment, with reference to the (k+1)-th analysis result, which has been acquired through analyzing the (k+1)-th chart information by using at least one k-th analysis tool. Herein, the at least one piece of specific process equipment corresponds to at least one piece of ((k+1)_1)-st specific distribution information, in which the (k+1)-th anomaly pattern has been detected, among the ((k+1)_1_1)-st distribution information to the ((k+1)_1_m)-th distribution information corresponding to the (1_1)-st measurement values to the (1_m)-th measurement values. Further, the (1_1)-st measurement values to the (1_m)-th measurement values are acquired respectively by measuring the first resultant products to the m-th resultant products generated respectively from the first process equipment to the m-th process equipment, which are multiple pieces of process equipment capable of performing the specific manufacturing process.

As another example, the root cause analyzing device 300 may instruct the multimodal reasoning model 330 to generate, as the (k+1)-th anomaly cause text information, ((k+1)_2)-nd anomaly cause text information describing a cause of occurrence of the (k+1)-th anomaly pattern in at least one (1_2)-nd specific resultant product included in at least one specific set resultant product, with reference to the (k+1)-th analysis result, which has been acquired through analyzing the (k+1)-th chart information by using at least one k-th analysis tool. Herein, the at least one specific set resultant product corresponds to at least one piece of ((k+1)_2)-nd specific distribution information, in which the (k+1)-th anomaly pattern has been detected, among the ((k+1)_2_1)-st distribution information to the ((k+1)_2_n)-th distribution information corresponding to the (2_1)-st measurement values to the (2_n)-th measurement values. Further, the (2_1)-st measurement values to the (2_n)-th measurement values are acquired respectively by measuring the first set resultant products to the n-th set resultant products, which are multiple sets of resultant products, generated respectively from the specific process equipment, which is a single piece of process equipment, capable of performing the specific manufacturing process.

Next, while repeating the root cause analysis iteration, which includes the step of S140, i.e., generating the k-th anomaly analysis task, the step of S150, i.e., generating the (k+1)-th chart information, the step of S160, i.e., detecting the (k+1)-th anomaly pattern, and the step of S170, i.e., generating the (k+1)-th anomaly cause text information, the root cause analyzing device 300 may identify whether the root cause analysis iteration satisfies the preset termination condition at a step of S180. When the root cause analysis iteration satisfies the preset termination condition, the root cause analyzing device 300 may provide, through the multimodal reasoning model 330, the root cause information for the manufacturing process by referring to the final anomaly cause text information, which has been generated at the time of satisfying the preset termination condition, at a step of S190.

Herein, the root cause analyzing device 300 may determine that the root cause analysis iteration satisfies the preset termination condition when a reliability value for the (k+1)-th anomaly cause text information exceeds a preset threshold value, a cardinal number of the root cause analysis iteration exceeds a preset threshold number, or an execution time of the root cause analysis iteration exceeds a preset threshold time.

In addition, the root cause analyzing device 300 may instruct the multimodal reasoning model 330 to generate the report including at least part of k-th analysis task information, the (k+1)-th chart information, the (k+1)-th analysis result and the (k+1)-th anomaly cause text information by using a report tool, and provide the report to a user through the user interface 600.

For example, the root cause analyzing device 300 may instruct the multimodal reasoning model 330 to transmit at least part of the k-th analysis task information, the (k+1)-th chart information, the (k+1)-th analysis result and the (k+1)-th anomaly cause text information to the report module 500. Accordingly, the report module 500 may generate the report including at least part of the k-th analysis task information, the (k+1)-th chart information, the (k+1)-th analysis result and the (k+1)-th anomaly cause text information, and thus display the report through the user interface 600.

The method for performing the root cause analysis in the manufacturing process by using the agent-based multimodal reasoning model in accordance with one example embodiment of the present disclosure may be applied to various manufacturing fields including a batch or continuous processes such as a semiconductor manufacturing, a roll-to-roll coating process, an individual assembly and welding process, and a biopharmaceutical production, but the present disclosure is not limited thereto.

First, an example of applying the method for performing the root cause analysis in accordance with one example embodiment of the present disclosure to a semiconductor lithography process among the semiconductor manufacturing processes will be described by referring to FIG. 1, and FIG. 3 to FIG. 5. In the following description, detailed descriptions of parts that can be easily understood from the description by referring to FIG. 1 and FIG. 2 will be omitted.

The data collection module 100 may acquire the process data from at least one piece of process equipment 10 capable of performing the lithography process, such as a lithography scanner, a track, etching equipment, etc., and may acquire the measurement data from at least one piece of measurement equipment 20 for measuring an overlay of a semiconductor substrate. Herein, the process data may include recipe parameters, equipment event logs, sensor traces and lot identifiers, but the present disclosure is not limited thereto, and may include various process data related to the lithography process. In addition, the measurement data may include overlay measurement values, critical dimension (CD) measurement values, and defect inspection results, but the present disclosure is not limited thereto, and may include various measurement data acquired by measuring the semiconductor substrate on which the lithography process has been performed.

Figure 3:
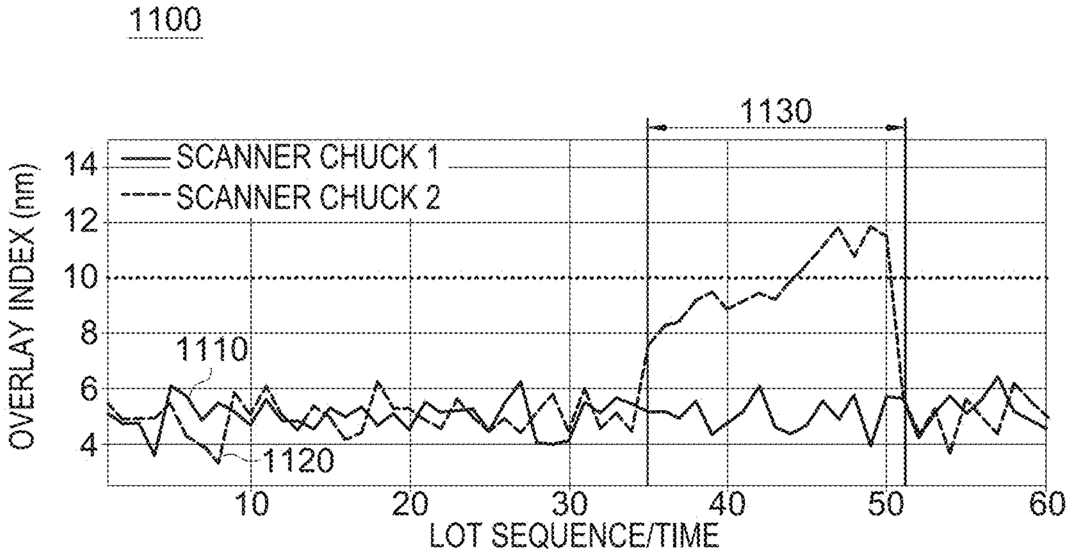
FIG. 3 to FIG. 5 are drawings schematically illustrating chart information generated by applying the method for performing the root cause analysis to a semiconductor manufacturing process through the agent-based multimodal reasoning model in accordance with one example embodiment of the present disclosure.

Also, as shown in FIG. 3, the root cause analyzing device 300 may generate, through the visualization module 400, at least one first chart 1100 by referring to the process data and the measurement data.

For reference, the first chart 1100 of FIG. 3 represents a (1_1)-st overlay trend 1110 generated by referring to the overlay measurement values of the semiconductor substrates on which the lithography processes were performed by using a scanner chuck 1, and a (1_2)-nd overlay trend 1120 generated by referring to the overlay measurement values of the semiconductor substrates on which the lithography processes were performed by using a scanner chuck 2. That is, the visualization module 400 may generate the first chart 1100 representing the overlay trend of the scanner chucks by using the first data related to overlays among the process data and the measurement data. Herein, in the first chart 1100 of FIG. 3, a horizontal axis may represent a time, a lot sequence, or a semiconductor substrate order, and a vertical axis may represent an overlay index such as an overlay average residual or a total overlay size.

Then, the root cause analyzing device 300 may input the first chart 1100 into the multimodal reasoning model 330, to thereby instruct the multimodal reasoning model 330 to generate the first anomaly cause text information explaining the cause of occurrence of the first anomaly pattern by referring to the at least one first analysis result, which has been acquired by analyzing the first chart 1100.

For reference, in the first chart 1100 of FIG. 3, it is exemplarily shown that the first anomaly pattern is induced in a specific section 1130, and accordingly, the multimodal reasoning model 330 may detect that the first anomaly pattern that deviates from a preset tolerance or a management limit in the first chart 1100 has occurred in the specific section 1130, and then analyze the defected first anomaly pattern, to thereby generate, as the first anomaly cause text information, an inference that there is a difference between the scanner chuck 1 and the scanner chuck 2 in the specific section 1130 and that the overlay of the scanner chuck 2 is significantly worse than the overlay of the scanner chuck 1.

Also, the root cause analyzing device 300 may input the first anomaly cause text information and the analysis policy for the lithography process into the multimodal reasoning model 330, to thereby instruct the multimodal reasoning model 330 to generate the first anomaly analysis task for analyzing the first anomaly cause by referring to the first anomaly cause text information and the analysis policy. Herein, the multimodal reasoning model 330 may determine the analysis method for statistically analyzing the first anomaly cause by referring to the first anomaly cause text information and the analysis policy, select the analysis tool for performing the determined analysis method, generate the code for executing the same, determine the chart type for visualizing the analysis result, which is acquired by the analysis tool, and generate the code for executing the chart tool for generating the corresponding chart type.

Herein, to determine whether the overlay measurement values are different between the scanner chuck 1 and the scanner chuck 2 in the specific section 1130, the multimodal reasoning model 330 may select a two-sample t-test, generate code to execute the two-sample t-test, and instruct the analysis tool to perform the t-test according to the generated code. For example, since the semiconductor substrates are processed under the same process conditions in two groups of the scanner chuck 1 and the scanner chuck 2, a paired t-test may be selected and applied, but the present disclosure is not limited thereto, and a one-way analysis of variance (ANOVA) may be selected and applied in other equipment configurations that compare two or more groups. For reference, the t-test is a statistical hypothesis-verification test method to determine whether the means of two groups are statistically and significantly different, and is tested by using a t-value, which is acquired by dividing a difference in the means of the two samples by a standard error, and if a calculated p-value is less than a significance level, it may be determined that the difference in the means between the two groups is statistically significant.

Figure 4:
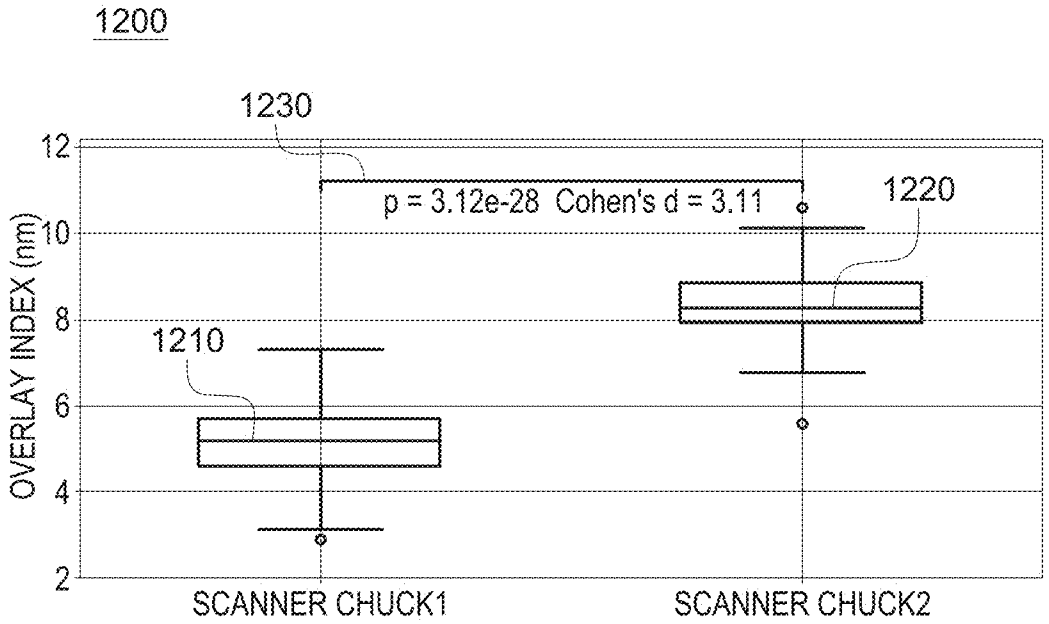

Accordingly, as shown in FIG. 4, the multimodal reasoning model 330 may generate a second chart 1200 by referring to a result of performing the t-test according to the generated first anomaly analysis task. Herein, the t-test is performed by referring to second data, which is the overlay measurement values of the scanner chuck 1 and the scanner chuck 2 corresponding to the specific section 1130 in the first chart 1100 of FIG. 3 in which the first anomaly pattern is detected.

For reference, the second chart 1200 of FIG. 4 represents a p-th value 1230 calculated through a (2_1)-st box plot 1210 representing an overlay distribution of the scanner chuck 1 in the section where the first anomaly pattern was detected and a (2_2)-nd box plot 1220 representing an overlay distribution of the scanner chuck 2 in the section where the first anomaly pattern was detected. Herein, the p-th value is calculated along with an estimated difference in the means between the overlay measurement values of the scanner chuck 1 and the overlay measurement values of the scanner chuck 2, a 95% confidence interval (CI) for the difference, and an effect size (e.g., Cohen's d).

Herein, before performing a statistical test such as the t-test, the multimodal reasoning model 330 may filter the data, stratify the data, or match the data to control confounding factors such as a good, a layer, a recipe, a reticle, an alignment model, an exposure condition, a measurement tool or a sampling plan.

Then, the multimodal reasoning model 330 may analyze the second chart 1200 of FIG. 4, and confirm the significant difference in the p-value, to thereby detect a second anomaly pattern in which the overlay measurement values of the scanner chuck 2 are different from the overlay measurement values of the scanner chuck 1. Accordingly, the multimodal reasoning model 330 may generate second anomaly cause text information indicating that a process change, i.e., an anomaly in the manufacturing process, has occurred in the scanner chuck 2. That is, the multimodal reasoning model 330 may propose to analyze whether there is a difference in a specific region through an inter-field overlay vector map and an intra-field overlay vector map of the semiconductor substrates between the scanner chuck 1 and the scanner chuck 2 through the second anomaly cause text information.

In addition, the multimodal reasoning model 330 may generate a second anomaly analysis task for analyzing a second anomaly cause by referring to the second anomaly cause text information and the analysis policy. Herein, the multimodal reasoning model 330 may determine the analysis method for statistically analyzing the second anomaly cause by referring to the second anomaly cause text information and the analysis policy, select the analysis tool for performing the determined analysis method, generate the code for executing the same, determine the chart type for visualizing the analysis result, which is acquired by the analysis tool, and generate the code for executing the chart tool for generating the corresponding chart type.

In addition, to analyze the cause of the process anomaly in the scanner chuck 2, the multimodal reasoning model 330 may generate, as the second anomaly analysis task, a plan to perform an overlay analysis on the semiconductor substrates on which the process has been performed on the scanner chuck 2.

Figure 5:
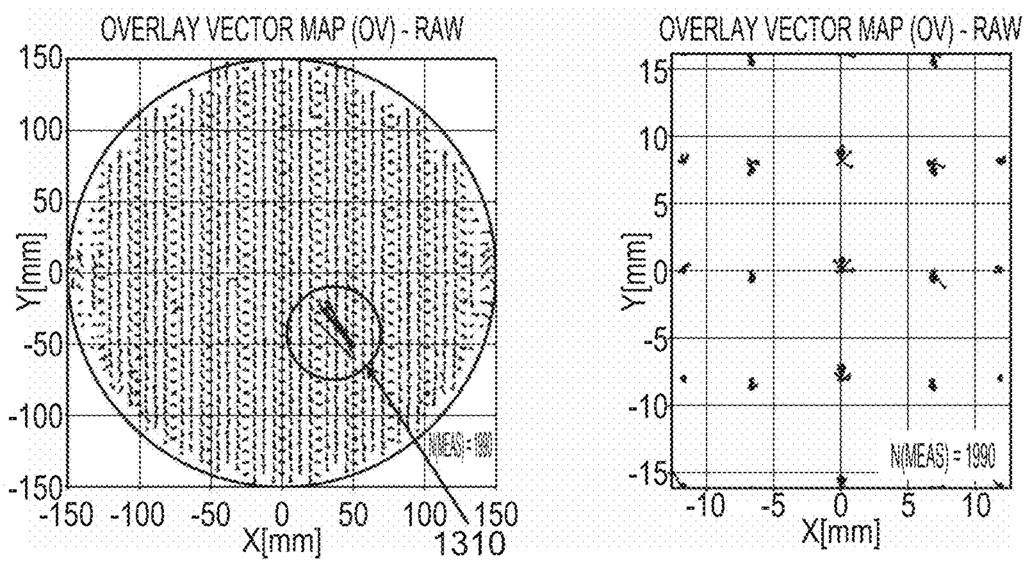

Then, as shown in FIG. 5, the multimodal reasoning model 330 may generate the code according to the second anomaly analysis task, to thereby instruct the visualization module 400 to generate, as a third chart, an overlay map, i.e., a spatial map, indicating an overlay status of the semiconductor substrates processed on the scanner chuck 1 and the scanner chuck 2.

For reference, a left side of FIG. 5 illustrates the inter-field overlay vector map in the semiconductor substrate, and a right side of FIG. 5 illustrates the intra-field overlay vector map regarding one of the fields in the left side of FIG. 5.

Herein, the multimodal reasoning model 330 may generate the overlay vector map by executing a map generation tool (not shown), generating a grid acquired by dividing the semiconductor substrate by preset intervals, aggregating the overlay vectors for each cell of the grid, and rendering deviations, which are distinguished by vector arrows or colors at corresponding locations. Through this, a local deviation area (such as an area 1310 in the left side of FIG. 5) may be displayed on the overlay vector map.

In addition, the multimodal reasoning model 330 may generate third anomaly cause text information by analyzing the third chart 1300.

That is, the multimodal reasoning model 330 may aggregate each of the overlay maps of each of the semiconductor substrates processed by each of the scanner chucks in a same process environment, such as a same good, a same layer, a same recipe, and a same reticle, and may determine whether the local deviation area (such as an area 1310 in the left side of FIG. 5) is consistently observed in the semiconductor substrates processed on a specific scanner chuck, i.e., the scanner chuck 2, while it is absent or statistically weak in reference semiconductor substrates, which are semiconductor substrates processed on other scanner chuck(s) or semiconductor substrates that have been determined to have no anomalies in the past.

Furthermore, if the local deviation area satisfies the determination condition, the multimodal reasoning model 330 may generate, as final anomaly cause text information of the manufacturing process, a candidate hypothesis indicating the root cause related to the scanner chuck 2, for example, a local chuck contamination, a chuck surface wear, a chuck thermal non-uniformity, etc. That is, the multimodal reasoning model 330 may analyze the inter-field vector map and the intra-field vector map of the semiconductor substrates where the processes were performed on the scanner chuck 1 and the scanner chuck 2, and infer the root cause that the significant difference between the scanner chuck 1 and the scanner chuck 2 is a phenomenon caused by a contamination in a certain region of the scanner chuck 2.

Then, the multimodal reasoning model 330 may generate and provide the report on the root cause analysis result of the manufacturing process, including the final anomaly cause text information, supporting evidences (i.e., generated chart information and analysis results, which are acquired by analyzing the chart information), reliability indicators, and alternative explanations.

Also, the multimodal reasoning model 330 may suggest additional investigations to find out whether this phenomenon has occurred before, in addition to reporting the contamination of the scanner chuck 2 as the root cause of the manufacturing process.

Next, an example of applying the method for performing the root cause analysis in accordance with one example embodiment of the present disclosure to an electrode coating process of a secondary battery will be described by referring to FIG. 1, FIG. 6 and FIG. 7. In the following description, detailed descriptions of parts that can be easily understood from the description by referring to FIG. 1 to FIG. 5 will be omitted.

The electrode coating process of the secondary battery may be a slot die coating process that coats electrodes by using slot die heads on a roll-to-roll line. The process data may include pressure logs and flow logs of a slot die coater and drying oven temperature profiles, and the measurement data may include laser thickness scan data. However, the present disclosure is not limited thereto, and may include various data related to the electrode coating process of the secondary battery.

Figure 6:
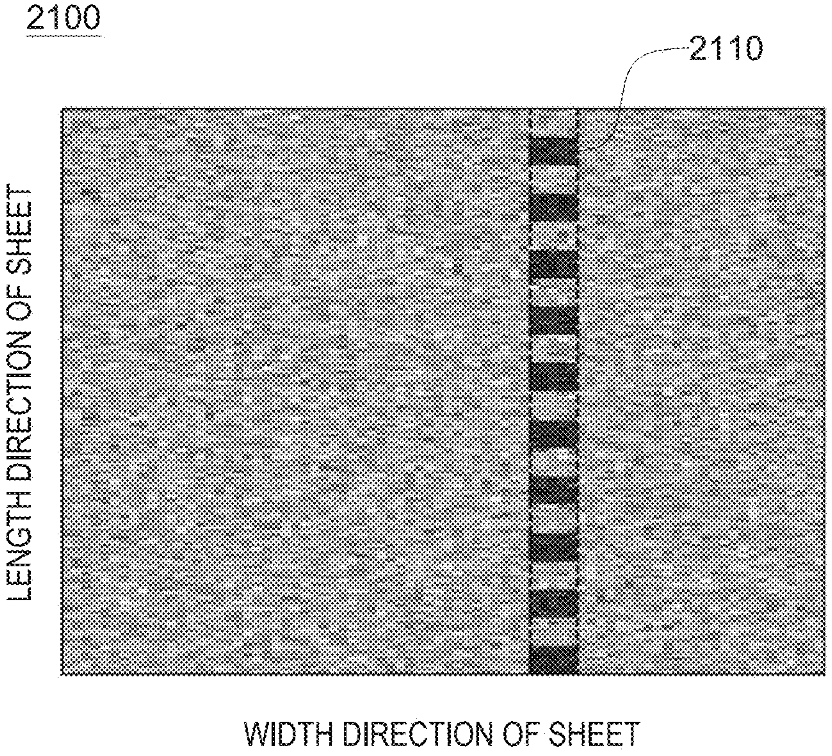
FIG. 6 and FIG. 7 are drawings schematically illustrating chart information generated by applying the method for performing the root cause analysis to an electrode coating process of a secondary battery through the agent-based multimodal reasoning model in accordance with one example embodiment of the present disclosure.

Furthermore, as shown in FIG. 6, the root cause analyzing device 300 may generate, as visualization chart information, a thickness heatmap 2100 in a width direction of a sheet through the visualization module 400.

For reference, a vertical direction in the thickness heatmap 2100 of FIG. 6 may be a length direction of the sheet, and may represent a state in which periodic thin coating stripes are created in a specific lane 2110.

Accordingly, the multimodal reasoning model 330 may detect the thin coating stripes created in the specific lane 2110 from the thickness heatmap 2100 of FIG. 6, and accordingly, a slurry viscosity analysis tool may be called to exclude viscosity changes by referring to the analysis policy. A reason for excluding the viscosity changes is that the coating stripes are detected only in the specific lane 210, not across all lanes of the sheet, indicating that the coating stripes are not caused by changes in a slurry viscosity.

Also, the multimodal reasoning model 330 may execute a die gap simulation to test whether a candidate cause of the coating stripes is related to a localized slot-die lip blockage or a shim wear.

Figure 7:
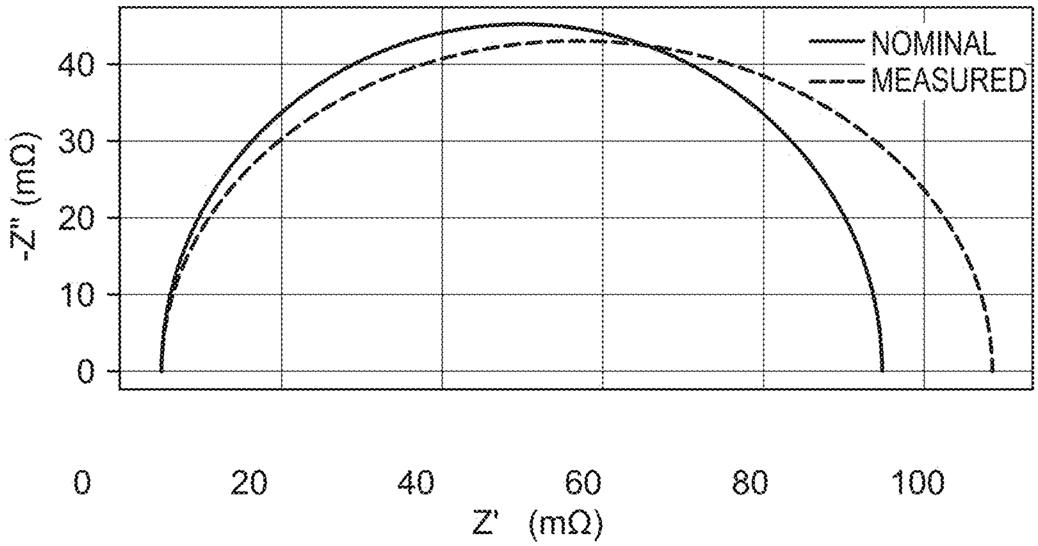

Accordingly, as shown in FIG. 7, the multimodal reasoning model 330 may perform an EIS (Electrochemical Impedance Spectroscopy) analysis according to the die gap simulation to generate an EIS Nyquist plot 2200 as an additional visualization chart. For reference, the EIS Nyquist plot visualizes data acquired from the EIS, i.e., measured data indicated by a dotted line in FIG. 7, and may represent characteristics such as resistance and capacity occurring at an electrode surface of the secondary battery by indicating an imaginary part of an impedance, i.e., vertical axis z", against a real part of the impedance, i.e., horizontal axis z'.

Then, the multimodal reasoning model 330 may analyze the EIS Nyquist plot 2200 of FIG. 7, and when the detected coating stripes are periodic and the corresponding lane (such as an area 2110 in FIG. 6) matches the simulation result, the multimodal reasoning model 330 may determine that the coating stripes are caused from the localized slot-die lip blockage or the shim wear. Accordingly, a report on a corrective action, such as replacing a shim in a specific slot-die area with a shim having a specific thickness, may be generated. Herein, the shim in the specific slot-die area is a shim of a specific slot die coater that coats the electrodes in the specific lane, corresponding to the specific lane (such as an area 2110 in FIG. 6).

Next, an example of applying the method for performing the root cause analysis in accordance with one example embodiment of the present disclosure to a body welding and an assembly process of an automobile will be described by referring to FIG. 1, FIG. 8 and FIG. 9. In the following description, detailed descriptions of parts that can be easily understood from the description by referring to FIG. 1 to FIG. 5 will be omitted.

The body welding and the assembly process of the automobile may be individual assembly processes performed by a station or a robot, such as the body welding and a bolting of the automobile. The process data may include current and voltage waveforms, servo motor parameters, welding current and voltage logs, and the measurement data may be quality inspection results including weld nugget measurement values and 3D coordinates.

Figure 8:
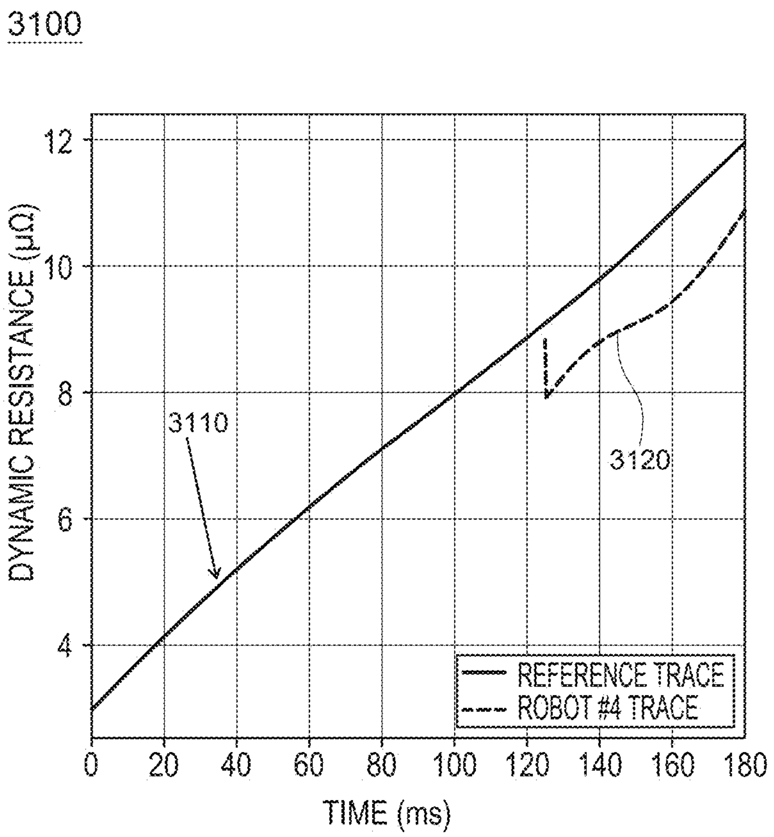
FIG. 8 and FIG. 9 are drawings schematically illustrating chart information generated by applying the method for performing the root cause analysis to a body welding and an assembly process of an automobile through the agent-based multimodal reasoning model in accordance with one example embodiment of the present disclosure.

Also, as shown in FIG. 8, the root cause analyzing device 300 may generate, as the visualization chart information, a dynamic resistance trend 3100 of the body welding and the assembly process of the automobile through the visualization module 400.

For reference, the dynamic resistance trend 3100 in FIG. 8 may represent a state in which an abnormal waveform occurs in a trace 3120 of a specific robot or a specific station in a latter half, compared to a reference trace 3110.

Accordingly, the multimodal reasoning model 330 may analyze the dynamic resistance trend of FIG. 8 and detect an occurrence of the abnormal waveform in the trace 3120 of the specific robot or the specific station. To verify this, the multimodal reasoning model 330 may execute the analysis tool to determine whether a welding spot welded by the specific robot or the specific station has an anomaly.

Figure 9:
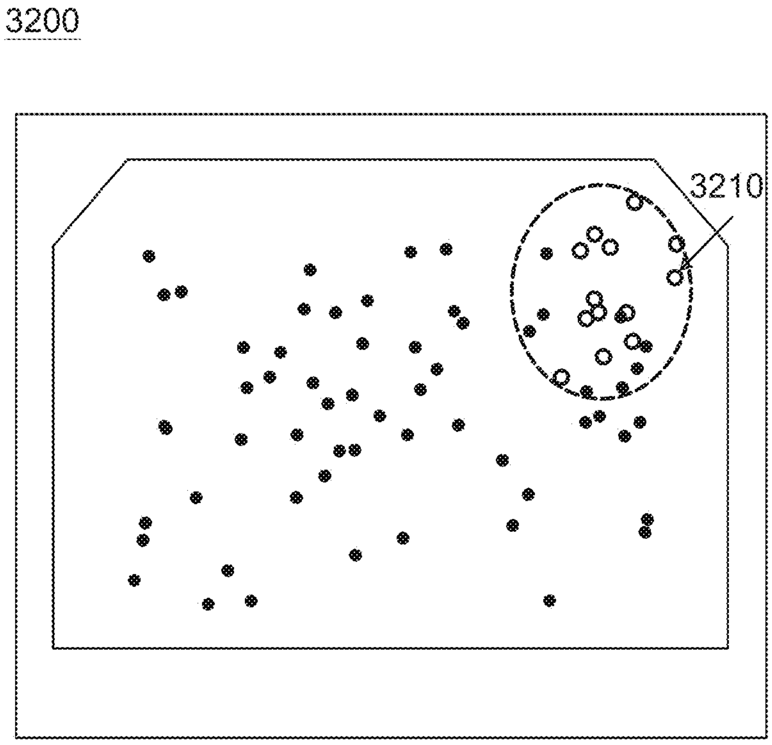

Accordingly, as shown in FIG. 9, the multimodal reasoning model 330 may generate a welding spot map 3200 by plotting the welding spots in a body coordinate system where the welding process was performed by the specific robot or the specific station.

Also, the multimodal reasoning model 330 may identify a spatial anomaly cluster 3210 for the welding spots in the welding spot map 3200 of FIG. 9.

Then, the multimodal reasoning model 330 may call a waveform analysis tool to compare the trace of the specific robot or the specific station with the reference trace. Herein, the abnormal waveform and the spatial anomaly cluster were detected in the specific robot or the specific station.

Accordingly, the multimodal reasoning model 330 may determine that a waveform alignment in the dynamic resistance trend 3100 of FIG. 8 is due to a decrease in current density in the latter half of a pulse, which can be inferred to be consistent with wear of a welding tip or an increase in contact resistance.

Furthermore, the multimodal reasoning model 330 may generate a report recommending shortening a tip dressing cycle and replacing the welding tip based on the inferred result.

Next, an example of applying the method for performing the root cause analysis in accordance with one example embodiment of the present disclosure to a biopharmaceutical culture process will be described by referring to FIG. 1, FIG. 10 and FIG. 11. In the following description, detailed descriptions of parts that can be easily understood from the description by referring to FIG. 1 to FIG. 5 will be omitted.

The biopharmaceutical culture process may monitor a batch over time by using multiple sensor trajectories, including a pH, a dissolved oxygen (DO), an agitation speed, and a feed profile. The batch may be compared to a past high-yield batch to detect a process deviation.

Figure 10:
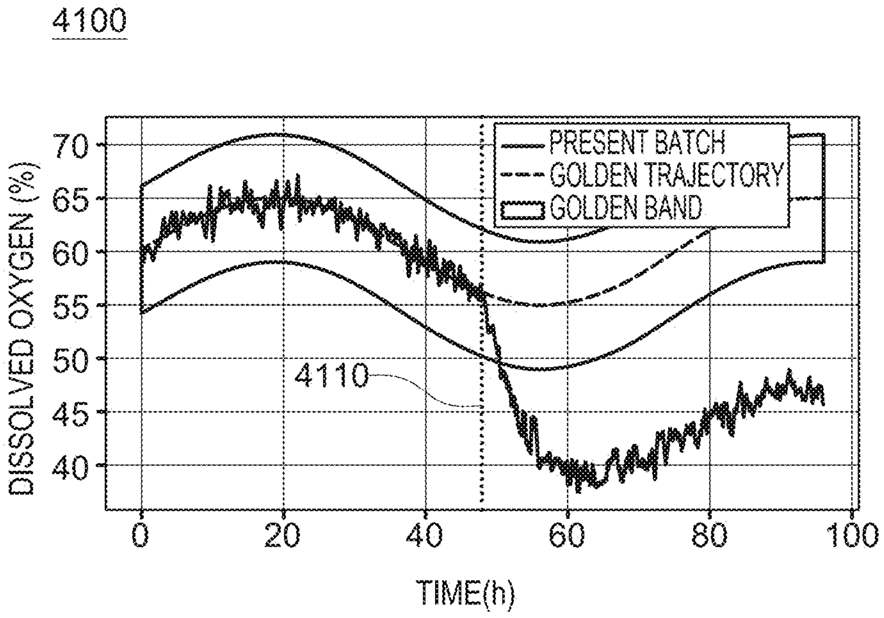
FIG. 10 and FIG. 11 are drawings schematically illustrating chart information generated by applying the method for performing the root cause analysis to a biopharmaceutical culture process through the agent-based multimodal reasoning model in accordance with one example embodiment of the present disclosure.

Also, as shown in FIG. 10, the root cause analyzing device 300 may generate, as the visualization chart information, a golden batch trajectory chart 4100 for the dissolved oxygen through the visualization module 400.

For reference, the golden batch trajectory chart 4100 in FIG. 10 may represent a state in which a dissolved oxygen trajectory of a present batch (solid line in FIG. 10) deviates from a golden trajectory (dotted line in FIG. 10) and a golden band, after a specific time 4110. Herein, the golden trajectory and the golden band correspond to the past high-yield batch.

Accordingly, in the golden batch trajectory chart 4100 of FIG. 10, the multimodal reasoning model 330 may detect that the dissolved oxygen trajectory of the present batch (solid line in FIG. 10) deviates from the golden band after the specific time 4110, and may call the analysis tool for analyzing a metabolic flow or an oxygen transfer to identify a candidate cause.

Figure 11:
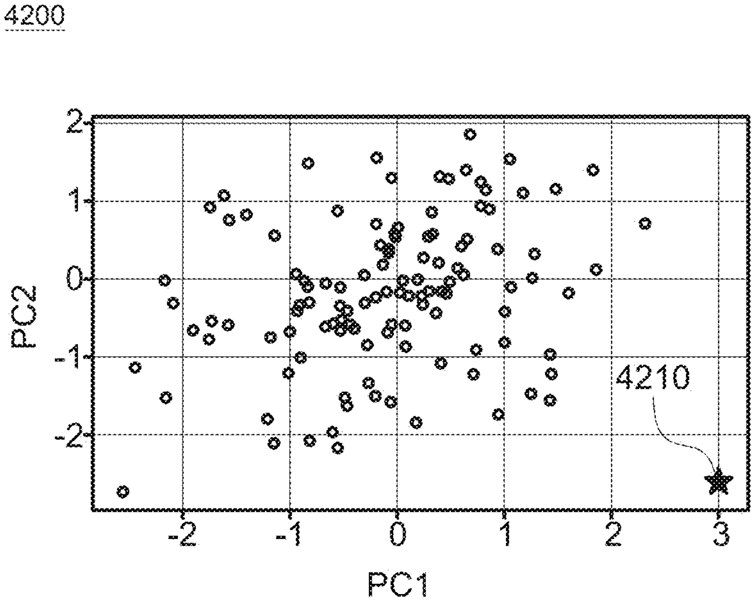

Accordingly, as shown in FIG. 11, the multimodal reasoning model 330 may generate, as an additional visualization chart information, a PCA score plot 4200 by referring to a result of analyzing the metabolic flow or the oxygen transfer. For reference, in the PCA score plot 4200 in FIG. 11, a horizontal direction may represent a metabolic transfer coefficient PC1, and a vertical direction may represent an oxygen transfer coefficient (KLa) PC2.

Then, as a result of confirming that a normal growth 4210 occurs while the oxygen transfer coefficient decreases by analyzing the PCA score plot 4200 of FIG. 11, the multimodal reasoning model 330 may infer that the normal growth (despite the fact that the normal growth should not occur) occurring while the oxygen transfer coefficient decreases is due to the decreased oxygen transfer rather than an accelerated metabolism.

Accordingly, to prevent the decreased oxygen transfer, the multimodal reasoning model 330 may generate a report recommending that a stirring RPM be increased by a preset amount and that a sparger bubble formation be inspected.

Meanwhile, the present disclosure may be applied to various manufacturing processes across various industries, not just the manufacturing process exemplified above, and may perform the root cause analysis that supports an iterative, a traceable, and an interpretable hypothesis-verification workflow that integrates the multimodal data from the various manufacturing processes.

The present disclosure has an effect of easily interpreting, by the user, the root cause of the anomaly occurring in the manufacturing process.

The present disclosure has another effect of performing the root cause analysis in the manufacturing process by integrating the multimodal data, which are acquired during the manufacturing process.

The present disclosure has still another effect of accurately analyzing the root cause of an actual symptom among potential factors causing similar symptoms in the manufacturing process.

The present disclosure has still yet another effect of supporting the iterative, the traceable, and the interpretable hypothesis-verification workflow that integrates the multimodal data.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled human in a field of computer software. Computer readable media may include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands may include not only a machine language code made by a complier but also a high level code that can be used by an interpreter etc., which is executed by a computer. The aforementioned hardware device may work as more than a software module to perform the action of the present invention and they may do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for performing a root cause analysis in a manufacturing process by using an agent-based multimodal reasoning model, comprising steps of:

(a) in response to acquiring at least one piece of first chart information generated by referring to first data, which is at least some data among process data and measurement data, wherein the process data has been acquired from at least one piece of process equipment capable of performing at least one manufacturing process for manufacturing a good, wherein the measurement data has been acquired by measuring a resultant product of the good generated by the process equipment, and wherein the resultant product is a finished product of the good or an intermediate product of the good, generating, by a root cause analyzing device, through the multimodal reasoning model, first anomaly cause text information explaining a cause of occurrence of a first anomaly pattern by referring to at least one first analysis result, which has been acquired by analyzing the first chart information;

(b) repeating, by the root cause analyzing device, a root cause analysis iteration to (i) generate, through the multimodal reasoning model, a k-th anomaly analysis task for analyzing a k-th anomaly cause by referring to k-th anomaly cause text information and preset analysis policy information, wherein k is an integer increasing from 1, (ii) generate, through the multimodal reasoning model, (k+1)-th chart information by referring to (k+1)-th data according to the k-th anomaly analysis task, wherein the (k+1)-th data is at least some data, among the process data and the measurement data, corresponding to a k-th anomaly pattern, and (iii) generate, through the multimodal reasoning model, (k+1)-th anomaly cause text information explaining a cause of occurrence of a (k+1)-th anomaly pattern by referring to at least one (k+1)-th analysis result, which has been acquired by analyzing the (k+1)-th chart information, and (c) in response to determining the root cause analysis iteration satisfies a preset termination condition, providing, by the root cause analyzing device, through the multimodal reasoning model, root cause information for the manufacturing process by referring to final anomaly cause text information, which has been generated at a time of satisfying the preset termination condition, and adjusting the manufacturing process based on the root cause information.

2. The method of claim 1, wherein, at the step of (a), the first chart information includes any one of (i) (1_1_1)-st trend information to (1_1_m)-th trend information representing each of trends of each of (1_1)-st measurement values to (1_m)-th measurement values, wherein the (1_1)-st measurement values to the (1_m)-th measurement values are acquired respectively by measuring first resultant products to m-th resultant products generated respectively from first process equipment to m-th process equipment capable of performing a specific manufacturing process, and wherein m is an integer greater than or equal to 2, and (ii) (1_2_1)-st trend information to (1_2_n)-th trend information representing each of trends of each of (2_1)-st measurement values to (2_n)-th measurement values, wherein the (2_1)-st measurement values to the (2_n)-th measurement values are acquired respectively by measuring first set resultant products to n-th set resultant products generated respectively from specific process equipment capable of performing the specific manufacturing process, and wherein n is an integer greater than or equal to 2, and wherein the root cause analyzing device detects, through the multimodal reasoning model, the first anomaly pattern from any one of (i) the (1_1_1)-st trend information to the (1_1_m)-th trend information and (ii) the (1_2_1)-st trend information to the (1_2_n)-th trend information, and generates, through the multimodal reasoning model, the first anomaly cause text information representing that an anomaly exists in any one of (i) one or more first specific measurement values corresponding to at least one piece of (1_1)-st specific trend information, in which the first anomaly pattern has been detected, among the (1_1_1)-st trend information to the (1_1_m)-th trend information, and (ii) one or more second specific measurement values corresponding to at least one piece of (1_2)-nd specific trend information, in which the first anomaly pattern has been detected, among the (1_2_1)-st trend information to the (1_2_n)-th trend information.

3. The method of claim 2, wherein, at the step of (b), the root cause analyzing device instructs the multimodal reasoning model to (i) generate, as the (k+1)-th chart information, any one of (i-1)((k+1)_1_1)-st distribution information to ((k+1)_1_m)-th distribution information, which are distributions for each of (1_1)-st partial measurement values to (1_m)-th partial measurement values that are part of the (1_1)-st measurement values to the (1_m)-th measurement values, corresponding to a period in which the k-th anomaly pattern is detected, and (i-2)((k+1)_2_1)-st distribution information to ((k+1)_2_n)-th distribution information, which are distributions for each of (2_1)-st partial measurement values to (2_n)-th partial measurement values that are part of the (2_1)-st measurement values to the (2_n)-th measurement values, corresponding to a period in which the k-th anomaly pattern is detected, by using a k-th chart generating tool according to the k-th anomaly analysis task, (ii) generate, as the (k+1)-th anomaly cause text information, any one of (ii-1)((k+1)_1)-st anomaly cause text information describing a cause of occurrence of the (k+1)-th anomaly pattern in at least one (1_1)-st specific resultant product manufactured by at least one piece of specific process equipment, wherein ((k+1)_1)-st anomaly cause text information corresponds to at least one piece of ((k+1)_1)-st specific distribution information, in which the (k+1)-th anomaly pattern has been detected, among the ((k+1)_1_1)-st distribution information to the ((k+1)_1_m)-th distribution information, and (ii-2)((k+1)_2)-nd anomaly cause text information describing a cause of occurrence of the (k+1)-th anomaly pattern in at least one (1_2)-nd specific resultant product included in at least one specific set resultant product, wherein ((k+1)_2)-nd anomaly cause text information corresponds to at least one piece of ((k+1)_2)-nd specific distribution information, in which the (k+1)-th anomaly pattern has been detected, among the ((k+1)_2_1)-st distribution information to the ((k+1)_2_n)-th distribution information, with reference to the (k+1)-th analysis result, which has been acquired through analyzing the (k+1)-th chart information by using at least one k-th analysis tool.

4. The method of claim 2, wherein, at the step of (b), the root cause analyzing device instructs the multimodal reasoning model to generate, as the (k+1)-th chart information, any one of (i) (1_1)-st spatial chart information representing a matching between at least one first sub-measurement value and at least one first sub-resultant product, wherein the at least one first sub-measurement value has been acquired from first specific measurement values, among the (1_1)-st measurement values to the (1_m)-th measurement values, corresponding to the k-th anomaly pattern, wherein the first sub-resultant product is a product in which the first sub-measurement value is measured, and (ii) (1_2)-nd spatial chart information representing a matching between at least one second sub-measurement value and at least one second sub-resultant product, wherein the at least one second sub-measurement value has been acquired from second specific measurement values, among the (2_1)-st measurement values to the (2_n)-th measurement values, corresponding to the k-th anomaly pattern, wherein the second sub-resultant product is a product in which the second sub-measurement value is measured, according to the k-th anomaly analysis task.

5. The method of claim 1, wherein, at the step of (b), the root cause analyzing device instructs the multimodal reasoning model to generate a report including at least part of k-th analysis task information, the (k+1)-th chart information, the (k+1)-th analysis result and the (k+1)-th anomaly cause text information by using a report tool, and provide the report to a user through a user interface.

6. The method of claim 1, wherein, at the step of (c), the root cause analyzing device determines that the root cause analysis iteration satisfies the preset termination condition when a reliability value for the (k+1)-th anomaly cause text information exceeds a preset threshold value, a cardinal number of the root cause analysis iteration exceeds a preset threshold number, or an execution time of the root cause analysis iteration exceeds a preset threshold time.

7. The method of claim 1, wherein, at the step of (a), the root cause analyzing device generates, through a visualization module, the first chart information by referring to the first data, which has been acquired from a database storing the process data and the measurement data.

8. The method of claim 1, wherein, at the step of (b), the root cause analyzing device instructs the multimodal reasoning model to generate, through a visualization module, the (k+1)-th chart information by referring to the (k+1)-th data, which has been acquired from a database storing the process data and the measurement data.

9. The method of claim 1, wherein, at the step of (a), the root cause analyzing device instructs the multimodal reasoning model to detect the first anomaly pattern from a first image or a first video in which the first chart information is indicated, wherein, at the step of (b), the root cause analyzing device instructs the multimodal reasoning model to detect the (k+1)-th anomaly pattern from a (k+1)-th image or a (k+1)-th video in which the (k+1)-th chart information is indicated.

10. A non-transitory computer-readable recording medium for storing computer-executable instructions, wherein the computer-readable recording medium implements the method for performing the root cause analysis according to claim 1 in response to the execution of the computer-executable instructions.

11. A root cause analyzing device for performing a root cause analysis in a manufacturing process by using an agent-based multimodal reasoning model, comprising:

at least one memory which saves instructions for performing the root cause analysis in the manufacturing process by using the agent-based multimodal reasoning model; and at least one processor configured to perform the root cause analysis in the manufacturing process by using the multimodal reasoning model according to the instructions saved in the memory to perform processes of: (I) in response to acquiring at least one piece of first chart information generated by referring to first data, which is at least some data among process data and measurement data, wherein the process data has been acquired from at least one piece of process equipment capable of performing at least one manufacturing process for manufacturing a good, wherein the measurement data has been acquired by measuring a resultant product of the good generated by the process equipment, and wherein the resultant product is a finished product of the good or an intermediate product of the good, generating, through the multimodal reasoning model, first anomaly cause text information explaining a cause of occurrence of a first anomaly pattern by referring to at least one first analysis result, which has been acquired by analyzing the first chart information; (II) repeating a root cause analysis iteration to (i) generate, through the multimodal reasoning model, a k-th anomaly analysis task for analyzing a k-th anomaly cause by referring to k-th anomaly cause text information and preset analysis policy information, wherein k is an integer increasing from 1, (ii) generate, through the multimodal reasoning model, (k+1)-th chart information by referring to (k+1)-th data according to the k-th anomaly analysis task, wherein the (k+1)-th data is at least some data, among the process data and the measurement data, corresponding to a k-th anomaly pattern, and (iii) generate, through the multimodal reasoning model, (k+1)-th anomaly cause text information explaining a cause of occurrence of a (k+1)-th anomaly pattern by referring to at least one (k+1)-th analysis result, which has been acquired by analyzing the (k+1)-th chart information, and (III) in response to determining the root cause analysis iteration satisfies a preset termination condition, providing, through the multimodal reasoning model, root cause information for the manufacturing process by referring to final anomaly cause text information, which has been generated at a time of satisfying the preset termination condition, and (IV) adjusting the manufacturing process based on the root cause information.

12. The root cause analyzing device of claim 11, wherein the first chart information includes any one of (i) (1_1_1)-st trend information to (1_1_m)-th trend information representing each of trends of each of (1_1)-st measurement values to (1_m)-th measurement values, wherein the (1_1)-st measurement values to the (1_m)-th measurement values are acquired respectively by measuring first resultant products to m-th resultant products generated respectively from first process equipment to m-th process equipment capable of performing a specific manufacturing process, and wherein m is an integer greater than or equal to 2, and (ii) (1_2_1)-st trend information to (1_2_n)-th trend information representing each of trends of each of (2_1)-st measurement values to (2_n)-th measurement values, wherein the (2_1)-st measurement values to the (2_n)-th measurement values are acquired respectively by measuring first set resultant products to n-th set resultant products generated respectively from specific process equipment capable of performing the specific manufacturing process, and wherein n is an integer greater than or equal to 2, and wherein, at the process of (I), the processor detects, through the multimodal reasoning model, the first anomaly pattern from any one of (i) the (1_1_1)-st trend information to the (1_1_m)-th trend information and (ii) the (1_2_1)-st trend information to the (1_2_n)-th trend information, and generates, through the multimodal reasoning model, the first anomaly cause text information representing that an anomaly exists in any one of (i) one or more first specific measurement values corresponding to at least one piece of (1_1)-st specific trend information, in which the first anomaly pattern has been detected, among the (1_1_1)-st trend information to the (1_1_m)-th trend information, and (ii) one or more second specific measurement values corresponding to at least one piece of (1_2)-nd specific trend information, in which the first anomaly pattern has been detected, among the (1_2_1)-st trend information to the (1_2_n)-th trend information.

13. The root cause analyzing device of claim 12, wherein, at the process of (II), the processor instructs the multimodal reasoning model to (i) generate, as the (k+1)-th chart information, any one of (i-1)((k+1)_1_1)-st distribution information to ((k+1)_1_m)-th distribution information, which are distributions for each of (1_1)-st partial measurement values to (1_m)-th partial measurement values that are part of the (1_1)-st measurement values to the (1_m)-th measurement values, corresponding to a period in which the k-th anomaly pattern is detected, and (i-2)((k+1)_2_1)-st distribution information to ((k+1)_2_n)-th distribution information, which are distributions for each of (2_1)-st partial measurement values to (2_n)-th partial measurement values that are part of the (2_1)-st measurement values to the (2_n)-th measurement values, corresponding to a period in which the k-th anomaly pattern is detected, by using a k-th chart generating tool according to the k-th anomaly analysis task, (ii) generate, as the (k+1)-th anomaly cause text information, any one of (ii-1)((k+1)_1)-st anomaly cause text information describing a cause of occurrence of the (k+1)-th anomaly pattern in at least one (1_1)-st specific resultant product manufactured by at least one piece of specific process equipment, wherein ((k+1)_1)-st anomaly cause text information corresponds to at least one piece of ((k+1)_1)-st specific distribution information, in which the (k+1)-th anomaly pattern has been detected, among the ((k+1)_1_1)-st distribution information to the ((k+1)_1_m)-th distribution information, and (ii-2)((k+1)_2)-nd anomaly cause text information describing a cause of occurrence of the (k+1)-th anomaly pattern in at least one (1_2)-nd specific resultant product included in at least one specific set resultant product, wherein ((k+1)_2)-nd anomaly cause text information corresponds to at least one piece of ((k+1)_2)-nd specific distribution information, in which the (k+1)-th anomaly pattern has been detected, among the ((k+1)_2_1)-st distribution information to the ((k+1)_2_n)-th distribution information, with reference to the (k+1)-th analysis result, which has been acquired through analyzing the (k+1)-th chart information by using at least one k-th analysis tool.

14. The root cause analyzing device of claim 12, wherein, at the process of (II), the processor instructs the multimodal reasoning model to generate, as the (k+1)-th chart information, any one of (i) (1_1)-st spatial chart information representing a matching between at least one first sub-measurement value and at least one first sub-resultant product, wherein the at least one first sub-measurement value has been acquired from first specific measurement values, among the (1_1)-st measurement values to the (1_m)-th measurement values, corresponding to the k-th anomaly pattern, wherein the first sub-resultant product is a product in which the first sub-measurement value is measured, and (ii) (1_2)-nd spatial chart information representing a matching between at least one second sub-measurement value and at least one second sub-resultant product, wherein the at least one second sub-measurement value has been acquired from second specific measurement values, among the (2_1)-st measurement values to the (2_n)-th measurement values, corresponding to the k-th anomaly pattern, wherein the second sub-resultant product is a product in which the second sub-measurement value is measured, according to the k-th anomaly analysis task.

15. The root cause analyzing device of claim 11, wherein, at the process of (II), the processor instructs the multimodal reasoning model to generate a report including at least part of k-th analysis task information, the (k+1)-th chart information, the (k+1)-th analysis result and the (k+1)-th anomaly cause text information by using a report tool, and provide the report to a user through a user interface.

16. The root cause analyzing device of claim 11, wherein, at the process of (III), the processor determines that the root cause analysis iteration satisfies the preset termination condition when a reliability value for the (k+1)-th anomaly cause text information exceeds a preset threshold value, a cardinal number of the root cause analysis iteration exceeds a preset threshold number, or an execution time of the root cause analysis iteration exceeds a preset threshold time.

17. The root cause analyzing device of claim 11, wherein, at the process of (I), the processor generates, through a visualization module, the first chart information by referring to the first data, which has been acquired from a database storing the process data and the measurement data.

18. The root cause analyzing device of claim 11, wherein, at the process of (II), the processor instructs the multimodal reasoning model to generate, through a visualization module, the (k+1)-th chart information by referring to the (k+1)-th data, which has been acquired from a database storing the process data and the measurement data.

19. The root cause analyzing device of claim 11, wherein, at the process of (I), the processor instructs the multimodal reasoning model to detect the first anomaly pattern from a first image or a first video in which the first chart information is indicated, wherein, at the process of (II), the processor instructs the multimodal reasoning model to detect the (k+1)-th anomaly pattern from a (k+1)-th image or a (k+1)-th video in which the (k+1)-th chart information is indicated.

* * * * *